(12) United States Patent
Oshima et al.

(10) Patent No.: US 6,584,067 B2
(45) Date of Patent: Jun. 24, 2003

(54) OPTICAL RECORDING MEDIUM HAVING A RECORDING/REPRODUCING AREA WITH A SHAPED REGION

(75) Inventors: Noriaki Oshima, Kanagawa-ken (JP); Hideki Oono, Yamagata-ken (JP); Keiichiro Nishizawa, Kanagawa-ken (JP)

(73) Assignee: Tosoh Corporation, Yamaguchi-ken (JP)

( * ) Notice: Subject to any disclaimer, the term of this patent is extended or adjusted under 35 U.S.C. 154(b) by 0 days.

(21) Appl. No.: 09/796,792

(22) Filed: Mar. 2, 2001

(65) Prior Publication Data

US 2001/0055269 A1 Dec. 27, 2001

(30) Foreign Application Priority Data

Mar. 3, 2000 (JP) .................................. 2000-063376
May 31, 2000 (JP) .................................. 2000-166501

(51) Int. Cl.$^7$ ................................................ G11B 5/82
(52) U.S. Cl. ........................................................ 369/290
(58) Field of Search ................................ 369/289, 290, 369/272, 274.5

(56) References Cited

U.S. PATENT DOCUMENTS 4,447,899 A  *  5/1984  Geyer et al. ................. 369/111
4,475,179 A  * 10/1984  Geyer .......................... 369/47.13
4,686,666 A  *  8/1987  Dieffenbach .................. 369/290
5,657,311 A  *  8/1997  Takahashi ..................... 369/290

FOREIGN PATENT DOCUMENTS

JP    64-37735    *  2/1989

OTHER PUBLICATIONS

B.D. Terris et al., "Near–field optical data storage", Appl. Phys. Lett., 68(2), Jan. 8, 1996, pp. 141–143.

* cited by examiner

Primary Examiner—Aristotelis M. Psitos
(74) Attorney, Agent, or Firm—Sughrue Mion, PLLC

(57) ABSTRACT

An optical recording medium wherein a land and a groove are formed in both front and rear surfaces of a circular disk-like substrate respectively, at least a recording layer and a dielectric layer are formed on the surfaces of the substrate, and a hub is provided in only one of the surfaces and recording/reproducing are conducted by using a flying optical head, the optical recording medium being characterized in that in a state that the medium is supported by the hub so that the hub-attached surface directs downward, and in a region from the innermost periphery to L/3, where L is a distance from the innermost periphery to the outermost periphery of a recording/reproducing area, the center of curvature in a radial direction of that region exists at an opposite side with respect to the hub-attached surface of the optical recording medium, whereby the optical recording medium of high reliability wherein the distance between the flying optical head floating above the surface of the recording medium and the surface of the recording medium can be kept constant; uniform recording/reproducing signals can be obtained, and head crushing seldom occurs.

9 Claims, 4 Drawing Sheets

OPTICAL RECORDING MEDIUM HAVING A RECORDING/REPRODUCING AREA WITH A SHAPED REGION

BACKGROUND OF THE INVENTION

1. Field of the Invention

The present invention relates to a rewritable optical recording medium, in particular, an optical recording medium according to a surface-recording/reproducing system wherein laser light is not irradiated to a recording layer through a substrate but laser light is irradiated for recording/reproducing to the recording layer directly without passing through the substrate, or an optical recording medium according to a near-field optical recording system wherein recording/reproducing are conducted by laser light with use of a flying optical head.

2. Discussion of Background

An optical recording medium is a portable recording medium permitting large volume/high density recording, and there have been rapidly increasing demands of rewritable media for recording dynamic images or a large volume file for computers in current fashion of multi-media. In a magneto-optical recording medium as a kind of such optical recording medium, multi-layers including a recording layer are generally formed on a transparent circular disk-like substrate made of a plastic material or the like; recording and erasing are conducted by irradiating laser light while a magnetic field is applied, and reproducing is conducted by reflected laser light. As recording systems, a so-called optical modulation recording wherein information is erased by applying a fixed magnetic field, and then, recording is conducted by applying a fixed magnetic field having an opposite direction, has conventionally been utilized mainly. In recent years, however, a magnetic field modulation system wherein a magnetic field is modulated according to a recording pattern while laser is irradiated, has been noted as a system in which recording can be made in a single turn (direct overlight) and correct recording can be performed even at a high recording density.

Conventionally, laser was irradiated to the recording layer through the substrate in order to perform recording/reproducing. Recently, a so-called near-field optical recording wherein recording/reproducing are performed by bringing the optical head close to the recording layer, has been noted as means for increasing recording density (Appl. Phys. Lett. 68, p.141 (1996)). This recording method allows reproducing with shorter marks than the limit in the conventional recording (~λ/2NA: NA is a numerical aperture of an objective lens), which is determined by the wavelength (λ) of laser from a light source by using a solid immersion lens (Hereinbelow, referred to as SIL) head so that the laser beam spot size is reduced, and therefore, recording/reproducing can be realized at a super-high recording density.

In such near-field optical recording, it is necessary to bring the optical head close to the recording medium (~100 nm). Accordingly, the method of irradiating laser beams directly to the recording layer without passing through the substrate is used unlike the conventional magneto-optical recording medium wherein laser beams are irradiated to the recording layer through the substrate. Namely, the structure for the recording layer in the conventional optical recording medium generally comprises substrate/first protective layer/recording layer/second protective layer/reflective layer. On the other hand, the layer structure of the near-field optical recording has a contrary structure of, for example, substrate/reflective layer/first protective layer/recording layer/second protective layer so that laser beams are irradiated from a front surface side of layer to perform recording/reproducing (a surface-recording/reproducing system). In this case, a flying slider head (a flying optical head) is often utilized in order to bring the recording layer close to the SIL head. Further, in recording, it is reported that magnetic field modulation recording wherein laser beams are irradiated to increase temperature in the recording layer to the Curie temperature or more while a magnetic field is modulated by a thin film coil formed on the slider head, is suitable for the near-field magneto-optical recording.

In the near-field optical recording/reproducing system, the distance between the flying optical head and the recording medium is very small. Accordingly, there are risks that the intensity of recording/reproducing signals is fluctuated to cause a trouble in recording/reproducing even when the distance between the head and the surface of the recording medium slightly changed, or the head and the recording medium are broken by the contact of the head to the recording medium.

The near-field optical recording medium has a land and a groove for tracking laser beams and a header having a format information. Accordingly, the substrate for the near-field optical recording medium is generally obtained by injection-molding a thermoplastic resin by using stampers in which the land, the groove and the header are formed.

Further, for the purpose that an optical recording medium is supported by the spindle of a drive when the medium is set in the drive, a hub is attached to a substantially central portion of a surface of the optical recording medium. In order to keep the distance between the head flying above the optical recording medium and the surface of the recording medium constant, it is important to strictly control a deflection, a curve and so on, i.e., mechanical characteristics of the optical recording medium.

However, since the mechanical strength of a substrate made of a thermoplastic resin is lower than a substrate made of metal or glass, the former is easily deflected. Further, a strain is easily caused in the optical recording medium at an inner peripheral side of the recording/reproducing area in the vicinity of the hub when it is attached to the optical recording medium.

Therefore, in the conventional near-field optical recording medium using the substrate formed by injection-molding a thermoplastic resin, it was difficult to keep the distance between the head and the surface of the recording medium constant in the entire recording/reproducing area, and it was difficult to obtain uniform recording/reproducing signals.

Further, it is important that the recording medium has sufficient flying characteristics in the near-field optical recording since the distance between the SIL head and the recording medium is very small. Therefore, if foreign matters having a height exceeding a flying height of the SIL head deposit on the surface of the recording medium, there causes a trouble in recording/reproducing, and in a worst case, crushing by the SIL head may result. In order to avoid this, a method of removing foreign matters depositing on the surface of the recording medium by using the flying head, is proposed. According to this method, the head is floated above the recording medium to scan its surface whereby the foreign matters are swept by a head edge of the flying head so that the foreign matters deposited on the recording/reproducing area are moved to the outside of the area. Thus, the cleaning of the surface of the recording medium can be performed. In this method, however, when recording/ reproducing operations are repeated, foreign matters collected to an inner side from the recording/reproducing area are again brought to the recording/reproducing area during the rotation of the recording medium, or foreign matters collected to an outer side from the recording/reproducing area are again brought to the recording/reproducing area by head-loading. Thus, the conventional near-field optical recording medium according to the recording/reproducing system using the flying slider head could not maintain cleanness of the recording/reproducing area in a repeated use, and there was a problem in durability and reliability.

SUMMARY OF THE INVENTION

It is an object of the present invention to provide an optical recording medium having high durability and reliability capable of providing uniform recording/reproducing signals by keeping the distance between a flying optical head flying above the recording medium and the surface of the optical recording medium constant in the entire recording/reproducing area, suppressing the occurrence of crushing by the head, preventing the deposition of foreign matters on the recording/reproducing area in a repeated use, and maintaining high cleanness.

Namely, according to the present invention, there is provided an optical recording medium wherein at least a land and a groove are formed substantially concentrically or spirally in both front and rear surfaces of a circular plate-like substrate formed by injection-molding a thermoplastic resin, at least a recording layer and a dielectric layer are formed thereon, a hub is attached only to a surface, and recording/reproducing are conducted by laser light with use of a flying optical head, the optical recording medium being characterized in that in a state that the optical recording medium is supported by the hub so that the hub-attached surface directs downward, and in a region from the innermost periphery of a recording/reproducing area to L/3, where L is a distance in a radial direction from the innermost periphery to the outermost periphery of the recording/reproducing area, the center of curvature in a radial direction in said region exists at an opposite side with respect to the hub-attached surface of the optical recording medium.

In the optical recording medium of the present invention, it is preferable that the center of curvature in a radial direction even in a region from a position exceeding L/3 from the innermost periphery of the recording/reproducing area to the outermost periphery exists at an opposite side with respect to the hub-attached surface of the optical recording medium.

Further, in the optical recording medium of the present invention, it is preferable that in a region from the innermost periphery of the recording/reproducing area to L/3, the radius of curvature in a radial direction in a surface area of the optical recording medium having the same width as the slider of the flying optical head is 10 m or more, and it is preferable that in a region from a position exceeding L/3 from the innermost periphery of the recording/reproducing area to the outermost area, the radius of curvature in a radial direction of a surface area of the optical recording medium having the same width as the slider of the flying optical head is 10 m or more. Further, it is preferable that in the entire recording/reproducing area, the radius of curvature in a circumferential direction of a surface area of the optical recording medium having the same length as the slider of the flying optical head is 10 m or more.

Further, in the optical recording medium of the present invention, it is preferable that in a case that the innermost periphery of the recording/reproducing area is taken as standard, an optional point in a region which is outside from the standard and which is from the innermost periphery of the recording/reproducing area to L/3, is 5 $\mu$m~100 $\mu$m lower than the standard, and that an optional point in a region from a position exceeding L/3 from innermost periphery of the recording/reproducing area to the outermost periphery, is 5 $\mu$m 100 $\mu$m lower than the standard.

Further, there is provided an optical recording medium wherein a recording layer and a dielectric layer are formed on both surfaces of a resinous substrate, a hub is attached to a surface of the substrate, and information-recording/reproducing are conducted by laser light, the optical recording medium being characterized in that in a state that the optical recording medium stands perpendicularly, the hub-attached surface is curved in a convex form, and the flexural quantity is from 5 $\mu$m to 100 $\mu$m, whereby the flying head having an optical head (a flying optical head) can fly and move stably at both surfaces of the optical recording medium.

Further, an optical recording medium wherein a groove is formed in at least one of an inner side region and an outer side region with respect to the recording/reproducing area, is provided. When the surface of such recording medium is subjected to cleaning by using the flying head, scanning is conducted to the groove so that foreign matters deposited from the recording medium onto the head are caught by the groove. Accordingly, the foreign matters seldom deposit again on the recording/reproducing area of the optical recording medium even when the optical recording medium is used repeatedly.

The optical recording medium of the present invention is preferably used as an optical recording medium according to a surface-recording/reproducing system wherein recording/reproducing are conducted by irradiating laser light directly to the recording layer without through the substrate, in particular, an optical recording medium according to a near-field optical recording system wherein recording/reproducing are conducted by bringing the flying optical head close by a distance of 100 nm or less to the surface of the recording medium.

Figure 1:
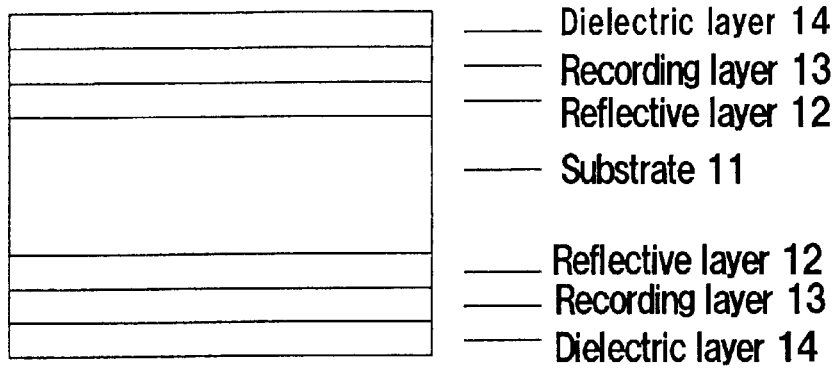
FIG. 1 is a partial cross-sectional view showing diagrammatically an example of the lamination structure of the optical recording medium of the present invention. A reflective layer 12, a recording layer 13 and a dielectric layer 14 are laminated in this order on both front and rear surfaces of a substrate 11 obtained by injection-molding a thermoplastic resin.

EXPLANATION OF REFERENCE NUMERALS 11, 21: substrate, 12, 22: reflective layer, 13, 23: recording layer, 14, 24: dielectric layer, 15: hub, 16: optical recording medium, 25: solid lubricant layer, 30: groove formed at inner periphery, 31: groove formed at outer periphery.

DETAILED DESCRIPTION OF THE PREFERRED EMBODIMENTS

FIG. 1 is a cross-sectional view showing diagrammatically an example of the lamination structure of the optical recording medium of the present invention. A reflective layer 12, a recording layer 13 and a dielectric layer 14 are laminated in this order on both front and rear surfaces of a substrate 11 wherein a land, a groove and a header are formed in the both front and rear surfaces. Further, a hub 15 is attached to a central portion of a surface of an optical recording medium 16 at a side facing the spindle of a drive (not shown).

The substrate 11 is obtained by injection-molding a thermoplastic resin in metallic dies wherein stampers in which a land, a groove and a header are formed are arranged on both surfaces of the metallic dies for example. As a material for the substrate, it is preferable to use a thermoplastic resin such as polycarbonate, amorphous polyolefin, polymethyl methacrylate, polyphenylene sulfide, polyallylate, polyetherketone, polyetheretherketone or a derivative thereof. Use of such a material for the substrate makes it easy to control the position of the center of curvature of the optical recording medium, the relative height of the surface of the optical recording medium and the value of the radius of curvature in a range specified in the present invention depending on conditions of injection-molding.

It is preferable that the diameter of the substrate used for the optical recording medium is 90~140 mm. Further, it is preferable that the thickness of the substrate used for the optical recording medium is 1~2.5 mm. In the case of substrate having such diameter and thickness, it is easy to control the position of the center of curvature of the optical recording medium, the relative height of the surface of the optical recording medium and the value of the radius of curvature in a range specified in the present invention depending on the conditions of injection-molding.

As the reflective layer 12, there is in particular no limitation as far as metal having a high reflectivity is used. For example, metal such as Al, Ag, Au, Cu or the like may be used solely, or an alloy containing any of these elements as the main component may be used.

Further, as the recording layer 13, there is in particular no limitation as far as a material can be used for an optical recording layer. For example, a magneto-optical recording layer of a material such as TbFeCo, DyFeCo, GdTbFeCo, NdDyFeCo, or phase-change recording layer of a material such as GeSbTe, AgInSbTe may be used. Such recording layer may be a single layer or a laminated layer formed by laminating layers having different functions or compositions.

The dielectric layer 14 is constituted by a transparent dielectric material such as SiN, AlN, SiAlON, $Ta_2O_5$ or the like. Further, a solid lubricant layer comprising diamond-like carbon (DLC) or the like composed of carbon added with hydrogen or nitrogen may be laminate on the dielectric layer, and further, a liquid lubricant layer may be coated on the solid lubricant layer. As the liquid lubricant layer, such one showing lubricant properties such as silicon oil, fluoropolyether type fluorine oil or the like may be used. However, perfluoropolyether or perfluoropolyether derivative is in particular preferable.

As the perfluoropolyether derivative, alcohol-modified perfluoropolyether, ester-modified perfluoropolyether, isocyanate-modified perfluoropolyether, carboxyl group-modified perfluoropolyether, piperonyl-modified perfluoropolyether or the like are mentioned.

The layer thickness of the lubricant layer in the present invention is preferably 0.3~4.0 nm. If the thickness is less than 0.3 nm, the protecting performance of the lubricant layer becomes poor and a flaw easily caused in the thin film. If the thickness exceeds 4.0 nm, the slider head contacts the disk to easily cause crushing.

For the hub 15 attached to the optical recording medium, there is in particular no limitation as far as such one which can be fixed to the spindle of a drive, e.g., a metal hub, metal insert hub or the like, is used. Further, the bonding of the hub to the optical recording medium can be conducted by using such means as an adhesive, ultrasonic welding or the like, and there is in particular no limitation as far as a sufficient bonding strength can be obtained.

The optical recording medium of the present invention is characterized in that in a state that the optical recording medium is supported by the hub so that the hub-attached surface directs downward, and in a region from innermost periphery of the recording/reproducing area to L/3, where L is a distance in a radial direction from the innermost periphery of the recording/reproducing area to the outermost periphery, the center of curvature in a radial direction in that region exists at an opposite side with respect to the hub-attached surface.

Figure 2:
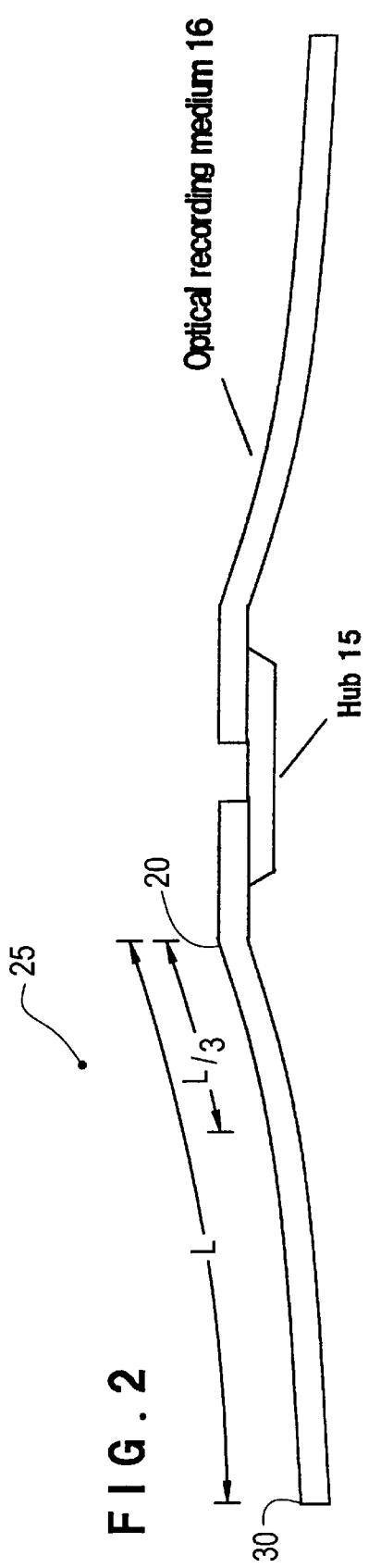
FIG. 2 is a cross-sectional view showing diagrammatically an example of the shape in cross section of the optical recording medium of the present invention. A hub 15 is attached to a central portion of an optical recording medium 16 at a surface side where the spindle of a drive (not shown) is located. The shape shown in the figure is exaggerated, and the reflective layer, the recording layer and the dielectric layer formed on the substrate are omitted.

FIG. 2 shows diagrammatically an example of the shape in cross section of the optical recording medium of the present invention. However, the present invention is not limited only to the shape shown in the Figure.

When the hub is attached to the optical recording medium by an adhesive, a local stress is produced in the vicinity of the adhesive due to a shrink of volume of the adhesive, or a local stress is produced in the vicinity of the attached hub due to a vibration energy in a case of ultrasonic welding. Such stress produces a strain at an inner periphery side of the optical recording medium whereby a concave and convex portion easily results in the surface of the optical recording medium, and the concave and convex portion adversely influences the flying characteristics of the head. Although the head flies above the optical recording medium so that the distance from the surface of the optical medium is kept constant, the head is lowered in a concave portion of the surface of the optical recording medium and is raised in a convex portion, with the result that the flying height of the head fluctuates. When the fluctuation becomes large, the intensity of the signals for optically recording/reproducing scatters, and further, head may contact the optical recording medium to cause crushing.

As described before, since the center of curvature in the recording/reproducing area of the optical recording medium exists at an opposite side with respect to the hub-attached surface, a shape-maintaining force in the optical recording medium is superior to a stress in the optical recording medium generated at the time of bonding the hub, and therefore, there is little influence to the flatness of the surface of the optical recording medium. It is further preferable that the center of curvature exists at an opposite side with respect to the hub-attached surface over the entire recording/reproducing area whereby the shape of the optical recording medium can stably be maintained.

As methods for controlling the position of the center of curvature of the surface of the optical recording medium, there are ① a method of providing a temperature difference in the metallic dies, i.e., a stationary side metallic die and a moving side metallic die used for injection-molding, ② a method of providing a difference of air pressure between a stationary side and a moving side when air is blown at the time of taking out the substrate from the metallic dies, and ③ a method of adjusting the condition of injection-molding such as changing the operational conditions of protrusion pin when the substrate is separated from the metallic dies.

With respect to the substrate formed by using shaping metallic dies having floating punch and protrusion pin for projecting the injection-molded substrate, it is preferable to attach the hub to the surface of the substrate at a side where there are the floating punch and the protrusion pin. The floating punch and the protrusion pin are operated when the injection-molded substrate is taken out from the metallic dies. In this case, since the temperature of the substrate at this stage is high, a large curve is easily produced in the central portion of the substrate when the punches and pins are operated.

It is preferable that the optical recording medium of the present invention has the structures of (1) to (3) as described below independently or in combination while the above-mentioned structure is maintained. With such, the distance between the flying optical head flying above the optical recording medium and the surface of the optical recording medium can be kept constant over the entire recording/reproducing area, and hence, uniform recording/reproducing signals can be obtained and the crushing by the head seldom occurs.

Specified structures are as follows.

(1) In a state that the optical recording medium is supported by the hub so that the hub-attached surface directs downward, and when the innermost periphery of the recording/reproducing area is taken as standard in a region from the innermost periphery to L/3, where L is a distance in a radial direction from the innermost periphery to the outermost periphery of the recording/reproducing area, a region outside from the standard is 5 μm~100 um lower than the standard.

When the optical recording medium has a curve in a radial direction, the curve is changed in a direction of being corrected due to a centrifugal force when the optical recording medium is rotated for recording/reproducing. In this case, if an outside region of the innermost periphery of the recording/reproducing region is lower than the innermost area, a stress is produced in an opposite side surface with respect to the hub-attached surface in a direction of shrinking the surface of the optical recording medium, and a stress is produced in the hub-attached surface in a direction of expanding. Accordingly, a stress, produced by bonding the hub, in an inner periphery portion of the surface of the optical recording medium is relaxed. As a result, the flatness can be improved and the flying characteristics of the head can be improved.

On the contrary, if an outside region of the innermost periphery of the optical-recording/reproducing area is higher than the innermost periphery, a stress is produced in the optical recording medium in a direction of expanding the opposite side surface with respect to the hub-attached surface and a stress is produced in the hub-attached surface in a direction of shrinking the surface. Accordingly, a stress, produced by bonding the hub, in an inner peripheral portion of the surface of the optical recording medium is further enhanced. As a result, a concave and a convex in the surface become large, and the flying characteristics of the head are deteriorated.

In lowering the height, a value of less than 5 μm is insufficient to relax a stress produced by the bonding of the hub. On the other hand, a value exceeding 100 μm will exceed the flexural quantity to be corrected at the time of rotating the optical recording medium, and the flying of the head becomes unstable.

It is further preferable that in order to relax effectively a stress, produced by bonding the hub, a region from a position exceeding L/3 from the innermost periphery to the outermost periphery is made 5 μm 100 μm lower than the standard, namely, that region is 5 μm 100 μm lower than the standard over the entire optical recording/reproducing area.

As methods for lowering the height from the standard on the surface of the optical recording medium, there are ① a method of providing a temperature difference of metallic dies, i.e., a stationary side metallic die and a moving side metallic die used for injection-molding, ② a method of providing a difference of air pressure between a stationary side and a moving side when air is blown at the time of taking out the substrate from the metallic dies, and ③ a method of adjusting the conditions of injection-molding such as changing the operational conditions of protrusion pin when the substrate is separated from the metallic dies.

(2) In a state that the optical recording medium is supported by the hub so that the hub-attached surface directs downward, and in a region from the innermost periphery of the recording/reproducing area to L/3, where L is a distance in a radial direction from the innermost periphery to the outermost periphery of the recording/reproducing area, the radius of curvature in a radial direction in a surface area of the optical recording medium having substantially the same width as the slider of the head is 10 m or more.

When a strain is produced in the vicinity of a region of inner peripheral side of the surface of the optical recording medium by bonding the hub, concave and convex portions are produced in the surface, which influence the flying characteristics of the head. However, when the concave and convex portions in the surface of the optical recording medium are larger than the size of the slider of the head, the head can follow easily the concave and convex portions. Accordingly, such concave and convex portions influence little to a fluctuation of the flying height. On the other hand, when convex and concave portions produced in the surface of the optical recording medium are smaller than the size of the slider, the concave and convex portions influence largely the flying height.

Accordingly, when the radius of curvature in a radial direction in a surface area of the optical recording medium having the same width as the slider of the head is as large as 10 m or more, a fluctuation of the flying height of the head is slight, and a scattered value of the intensity of recording/reproducing signals is in a negligible range. It is more preferable that there is no region having a radius of curvature of less than 10 m or more over the entire recording/reproducing area.

As methods for increasing the radius of curvature, there are ① a method of providing a temperature difference of metallic dies, i.e., a stationary side metallic die and a moving side metallic die used for injection-molding, ② a method of providing of air pressure between a stationary side and a moving side when air is blown at the time of taking out the substrate from the metallic dies, and ③ a method of adjusting the conditions of injection-molding such as changing the operational conditions of protrusion pin when the substrate is separated from the metallic dies.

As a method for measuring the radius of curvature of the surface of the optical recording medium, there is a method, for example, of measuring a displacement quantity in a direction of height by using a contact needle type displacement quantity gauge or an optical type displacement quantity gauge for measuring an upper surface of the optical recording medium or by using the optical type displacement quantity gauge for measuring a lower surface of it in a state that the optical recording medium is supported by the hub so that the hub-attached surface directs downward, and calculating a radius of curvature depending on the width or the length of the slider of the head based on the measured data of displacement quantity.

(3) In a state that the optical recording medium is supported by the hub so that the hub-attached surface directs downward, the radius of curvature in a circumferential direction of a surface area of the optical recording medium having the same length as the slider of the head is 10 m or more. When the radius of curvature in a circumferential direction is as large as 10 m or more in the same manner as the radius of curvature in a radial direction, a fluctuation of the flying height of the head is slight even when the height is fluctuated, and a scattered value of the intensity of recording/reproducing signals is in a negligible range.

In the above-mentioned explanation, a case that the optical recording medium of the present invention is supported so that the hub-attached surface directs downward. In a case that a non-recording/reproducing area in a central portion of the optical recording medium is supported in a state that the hub-attached surface directs upward, it is preferable that the radius of curvature Rr in a radial direction of an upper surface area of the recording medium having the same width as the slider of the head is 1 m≦Rr≦10 m. Further, it is preferable that the radius of curvature Rt in a circumferential direction of an upper surface area of the medium having the same length as the slider of the head is 1 m≦Rt≦10 m. It is further preferable that the center of curvature of a circular arc, in a radial direction of the recording medium, including 3 points in the innermost periphery, the outermost periphery and an intermediate portion of the recording/reproducing area, exists at a lower side of the circular arc.

Further, in the present invention, the hub is attached only to a surface of the medium. In this case, the surface of the recording/reproducing area in the hub-attached surface has a convex-surface structure wherein the surface is curved in a convex form in a state that the optical recording medium stands perpendicularly. This structure is effective in forming an optical recording medium in which the center of curvature in a radial direction in a region from the innermost periphery of an optical recording/reproducing area to L/3, where L is a distance in a radial direction from the innermost periphery to the outermost periphery of the optical recording/reproducing area, exists at an opposite side with respect to the hub-attached surface.

A resinous substrate obtained by injection-molding has a low elastic modulus in comparison with a substrate made of glass or aluminum used for a hard disk, and a curve is produced in a downward direction due to the own weight of the substrate influenced by gravity.

As a result, when a substrate formed into flat is set horizontally on a glide tester or a drive, the substrate is curved in a direction of a surface clamped with the hub, whereby the flying characteristics of the flying slider head are deteriorated with respect to both surfaces of the optical recording medium.

Accordingly, in shaping the substrate, the substrate should be formed to have a curved shape so that the hub-attached surface is in a convex form. Then, at least a recording layer and a dielectric layer are laminated on the curved substrate in preparing a recording medium. Thus, a curved recording medium can be obtained in measuring the recording medium in a state of standing perpendicularly. When the recording medium is set horizontally on the glide tester or the drive after a hub for clamping used for a glide tester or a drive has been attached to the surface having a curve of convex form of the recording medium, the curved substrate becomes straight due to gravity. Accordingly, it is possible to provide excellent flying characteristics to the flying slider head with respect to both surfaces of the substrate.

In the present invention, the flexural quantity of the optical recording medium varies depending on the diameter and the thickness of the substrate. However, it is preferable that the flexural quantity is from 5 μm to 100 μm in a case that the diameter of the substrate is 90 mm to 140 mm and the thickness of the substrate is 1 mm to 2.5 mm.

When the flexural quantity is less than 5 μm, a curve in the optical recording medium due to gravity is too large even in a substrate having a diameter of 90 mm and a thickness of 2.5 mm, and the stability in flying of the flying optical head is deteriorated.

Further, even when a substrate having a diameter of 140 mm and a thickness of 1 mm is used, a curve is too large when the flexural quantity is more than 100 μm, and the curve can not be corrected even when a force of curving in the opposite direction due to gravity acts on the substrate, whereby the stability in flying of the flying optical head is deteriorated.

The flexural quantity of the optical recording medium is represented by the maximum value of displacement quantities in a region from the innermost peripheral portion to the outermost peripheral portion in the entire periphery of the medium when the medium is measured in a state that it is supported perpendicularly.

Further, by forming a groove in at least one of a region inside from the recording/reproducing area and a region outside from that area in the substrate, the deposition of foreign matters on the recording/reproducing area in a repeated use can be eliminated to keep high cleanness, whereby the optical recording medium of high durability and reliability can be provided. It is preferable that the groove is arranged in a circle, or in a polygonal shape.

Figure 3:
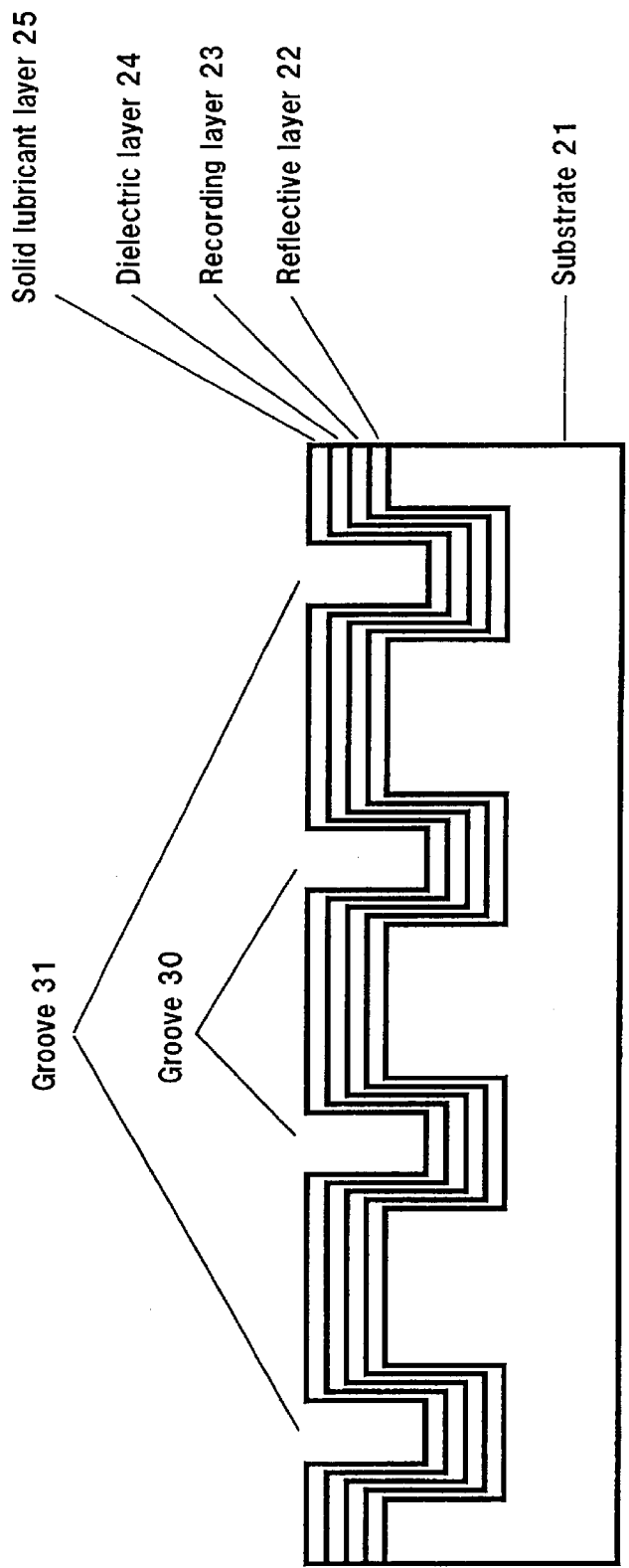
FIG. 3 is a cross-sectional view showing diagrammatically another example of the optical recording medium of the present invention. Grooves 30, 31 are formed at an inner side and an outer side with respect to a recording/reproducing area in the substrate 21. A reflective layer 22, a recording layer 23, a dielectric go, layer 24 and a solid lubricant layer 25 are laminated in this order on the substrate 21 including the grooves 30, 31. The shape shown in the figure is exaggerated, and the grooves and so on formed in the substrate are omitted.

FIG. 3 is a cross-sectional view showing diagrammatically another example of the optical recording medium of the present invention. Grooves 30, 31 are formed at an inner side and an outer side with respect to the recording/reproducing area in a substrate 21. A reflective layer 22, a recording layer 23, a dielectric layer 24 and a solid lubricant layer 25 are laminated in this order on the substrate 21 including the grooves 30, 31.

The substrate 21 is in particular not limited as far as it satisfies the properties as a substrate for the medium, such as mechanical properties, and glass, polycarbonate, amorphous polyolefin, engineering plastic or the like may be used. In the substrate, guide grooves or pits having a format information are formed.

The grooves 30, 31 may be formed either one of an inner side and an outer side with respect to the recording/reproducing area, or both the inner side and the outer side. When recording/reproducing are repeated on the optical medium, foreign matters may deposit on the recording/reproducing area on the recording medium. When cleaning is conducted to the recording medium by using the flying head, the head is moved to scan to a region of the grooves, whereby the foreign matters transferred from the recording medium and deposited on the head are caught by the grooves and accumulated on the grooves. The foreign matters accumulated in the grooves do not contact with the head for recording/reproducing, and there is no possibility that the foreign matters easily deposit again on the recording/reproducing area of the recording medium even when the recording medium is used repeatedly. The position of the grooves to be formed can be at an inner side with respect to an inner periphery of the recording/reproducing area or at an outer side from an outer periphery of the recording/reproducing area. The width and the depth of the grooves are in particular not limited because the width and the depth are depending on the size of the slider of the flying head used for cleaning the recording medium, a range of scanning and conditions of cleaning such as a linear velocity and so on in a case of flying the head. The flying height of the head decreases when the flying head for scanning on the recording medium reaches the grooves. However, an amount of decrease becomes large as the size of the slider of the head is smaller, or the width and the depth of the grooves formed in a lower portion of the slider are larger. If the flying height does not decrease when the head reaches the grooves of the recording medium, it is difficult that foreign matters depositing on the head are caught by the grooves. On the other hand, if the flying height decreases excessively, crushing is caused between the head and the recording medium. Further, it is important that the width and the depth of the grooves are determined so that they are large as possible to an extent that the crushing is not caused between the head and the recording medium and that clogging is not caused by the accumulation of the foreign matters. The grooves may have a curved line continuing in a circuit in a circumferential direction in the recording medium, or in a shape formed by arranging discretely a curved line or a straight line, or both the curved line and the straight line. Further, the grooves may be formed continuously or discretely in a radial direction from the center to an outer side of the recording medium. Further, it is preferable that the grooves are formed continuously or discretely in a circular periphery. Or, it is preferable that the grooves are formed continuously or discretely along a polygonal shape. In such case that the grooves are formed circularly or in a polygonal shape, a fluctuation of the flying height of the head on the same radius of the recording medium is small in cleaning the medium by the head, and cleaning can be conducted stably. As a method for forming the grooves, a force-cutting blade, laser or the like may be used.

EXAMPLES

Now, the present invention will be described in detail with reference to Examples. However, the present invention is by no means restricted by such specific examples.

Example 1

A circular substrate made of polycarbonate having a diameter of 130 mm and a thickness of 2 mm in which spiral land/groove portions having a track pitch of 0.43 $\mu$m, a header portion and an optical recording/reproducing area (L) formed in a range of radius of 20~60 mm were formed in both front and rear surfaces, was prepared by injection-molding at a die-clamping pressure of 120 kg/cm$^2$ at the maximum. As metallic dies used for the shaping, metallic dies having a structure comprising a moving side metallic die and a stationary side metallic die were used wherein the temperature of the mirror plate of the moving side metallic die was adjusted to 112° C. and the temperature of the mirror plate of the stationary side metallic die was adjusted to 110° C.

By using the substrate, layers were formed on both surfaces of the substrate by a sputtering method in a manner as described below.

First, on the substrate, a Al—3 wt % Cr alloy layer having a layer thickness of 50 nm was formed as a reflective layer by a DC sputtering method. On this, a first protective layer of SiN having a layer thickness of 5 nm was formed by a reactive RF sputtering method using a Si target in an atmosphere of a mixture of Al and $N_2$. On this, a magneto-optical recording layer comprising $Tb_{20}(Fe_{90}Co_{10})_{80}$ having a layer thickness of 20 nm was formed by a sputtering method using simultaneously a Tb target and a $Fe_{90}Co_{10}$ target.

On this, further, a second protective layer of SiN having a layer thickness of 50 nm was formed by a reactive RF sputtering method using a Si target in an atmosphere of a mixture of Al and $N_2$. On this, a DLC layer having a refractive index of 1.85 at 633 nm and a layer thickness of 10 nm was formed by a reactive RF sputtering method using a C target in an atmosphere of a mixture of Al and $CH_4$.

Then, on the opposite surface, a reflective layer, a magneto-optical recording layer, a second protective layer and a DLC layer were formed in the same manner as the above-mentioned surface. After the formation of the DLC layer, the optical recording medium was lifted up from a 0.01 wt % solution of piperonyl-modified perfluoropolyether ("Fomblin: AM2001" (trade name) manufactured by Ausimont Company) using a perfluoropolyether type solvent ("GALDEN SV-70" (trade name) manufactured by Ausimont Company) to coat a lubricant layer in a thickness of 1.5 nm. The layer thickness of the lubricant layer was calculated by using an X-ray photo-electron spectral method (XPS) and observing the Cls peak intensity.

Further, a metal insert hub was attached to a substantially central portion of the substrate surface formed by the mirror plate of a moving side metallic die by a UV curing type adhesive to thereby fabricate the magneto-optical recording medium capable of recording/reproducing in both surfaces.

Example 2

A magneto-optical recording medium capable of recording/reproducing in both surfaces was prepared by the same method as in Example 1 except that a pressure difference of air for blowing at the time of removing the substrate from the metallic dies in obtaining the substrate by injection-molding was provided between the stationary side metallic die and the moving side metallic die, and the pressure at the stationary side was 0.5 kg/cm$^2$ higher than that at the moving side. Then, the radius of curvature of the substrate was measured.

Comparative Example 1

A magneto-optical recording medium capable of recording/reproducing in both surfaces was prepared by the same method as Example 1 except that a temperature difference was provided between the mirror plate of a moving side metallic die and the mirror plate of a stationary side metallic die in obtaining the substrate by injection-molding wherein the temperature of the mirror plate of the stationary side was 2° C. higher than the temperature of the moving side. Then, the radius of curvature of the medium was measured.

Comparative Example 2

A magneto-optical recording medium capable of recording/reproducing in both surfaces was prepared by the same method as in Example 1 except that a pressure difference of air for blowing at the time of removing the substrate from metallic dies in obtaining the substrate by injection-molding was provided between a stationary side and a moving side wherein the pressure at the moving side was 0.5 kg/cm$^2$ higher than the pressure at the stationary side.

Then, the radius of curvature of the medium was measured.

The following evaluation was conducted to the near-field magneto-optical recording media prepared by the methods of Examples 1 and 2 and Comparative Examples 1 and 2.

The optical recording media were supported by hubs so that the hub-attached surfaces direct downward, and height displacement data on the surfaces directing upward and the surfaces directing downward were obtained by a RVA tester (manufactured by THOT TECHNOLOGY). The measurement was conducted in a range of radius of 19 to 61 nm at 4 positions in a circumferential direction of the optical recording media. On the basis of the height displacement data, displacement values of height (the maximum values) in a range of radius of 20~33 mm and in a range of a radius of 20~60 mm were calculated wherein the height at the point of radius of 20 mm was taken as a reference value.

Further, each radius of curvature in an area of 2 mm which corresponded to the width of the slider of the flying head was obtained by calculating successively in a range of a radius of 20~60 mm. At the same time, each center of curvature was obtained in a radius of 20~33 mm and a radius of 20~60 mm.

Further, the radius of curvature in a circumferential direction of each of the optical recording media was measured by using a measuring device as well. The measurement was conducted to each optical recording medium at each radial position at a pitch of 1 mm in a range of radius of 20~60 mm for each one circuit to obtain data of displacement of height. Based on the obtained data, the radius of curvature in a space of about 3 mm which corresponded to the length of the slider of the flying head was successively calculated to each radial position over one circuit.

Then, the flying characteristics of these optical recording media were evaluated. Each of the optical recording media was set on the spindle of a glide tester (manufactured by Hitachi Electronic Engineering Co.), and the optical recording medium was rotated at a linear velocity of 7 m/sec so that the flying height of the glide head (manufactured by Glide Light Company) with 70% slider and a load of 6.0 g having a piezo element from the optical recording medium was constant at 50 nm to seek once both front and rear surfaces simultaneously in a range of radius of 20~60 mm of the optical recording medium. Voltages induced in the piezo element were monitored, and the number of signals having a voltage value exceeding 500 mV was counted as the number of hit.

Subsequently, measurement of SNR was conducted. Each optical recording medium was rotated at 2,400 per minute to fly by dynamic loading a flying optical head having a laser wavelength of 680 nm and an effective numerical aperture of 1.2 on its thin layer at a height of 100 nm above the optical recording medium. Recording was conducted by irradiating pulsating laser to heat the recording layer to the Curie temperature or more while a magnetic field by the coil on the head was modulated with 10 MHz. SNR recorded with 10 MHz was measured at 10 radial positions of 20, 30, 40, 50 and 60 mm in the both front and rear surfaces of the recording medium to obtain scattering values from a difference between the maximum value and the minimum value with respect to each front and rear surface.

The SNR values were obtained by measuring under conditions that SNR becomes the maximum by adjusting power for reproducing each medium. Each result of evaluation was summarized in Table 1.

TABLE 1

| | Surface for evaluation | Displacement quantity of height ($\mu$m) | | Minimum value (m) of radius of curvature in radial direction | | Center of curvature | | Minimum value (m) of radius of curvature in circumferential direction | Number of hits (number) | Scattering of SNR (dB) |
|---|---|---|---|---|---|---|---|---|---|---|
| | | ⅓ inner periphery | Entire region | ⅓ inner periphery | Entire region | ⅓ inner periphery | Entire region | | | |
| Ex. 1 | Hub side | −10.5 | −33.8 | 11.8 | 10.9 | Opposite of hub side | Opposite of hub side | 12.4 | 0 | 0.7 |
| | Opposite of hub side | −11.1 | −34.2 | 11.5 | 11.5 | Opposite of hub side | Opposite of hub side | 12.7 | 1 | 0.7 |
| Ex. 2 | Hub side | −26.0 | −81.9 | 18.2 | 15.7 | Opposite of hub side | Opposite of hub side | 18.0 | 0 | 0.3 |
| | Opposite of hub side | −25.6 | −77.3 | 17.4 | 16.6 | Opposite of hub side | Opposite of hub side | 17.6 | 0 | 0.4 |
| Comp. Ex. 1 | Hub side | +9.4 | +30.3 | 8.7 | 8.7 | Hub side | Hub side | 9.6 | 107 | 3.2 |
| | Opposite of hub side | +10.8 | +31.7 | 9.4 | 9.4 | Hub side | Hub side | 9.2 | 91 | 3.6 |

TABLE 1-continued

| | | Displacement quantity of height (μm) | | Minimum value (m) of radius of curvature in radial direction | | Center of curvature | | Minimum value (m) of radius of curvature in circumferential direction | Number of hits (number) | Scattering of SNR (dB) |
|---|---|---|---|---|---|---|---|---|---|---|
| | Surface for evaluation | 1/3 inner periphery | Entire region | 1/3 inner periphery | Entire region | 1/3 inner periphery | Entire region | | | |
| Comp. Ex. 2 | Hub side | +23.4 | +66.5 | 5.3 | 5.3 | Hub side | Hub side | 7.1 | 154 | 4.5 |
| | Opposite of hub side | +22.1 | +66.1 | 6.5 | 6.5 | Hub side | Hub side | 7.7 | 140 | 4.0 |

In Examples 1 and 2, the height in a radial direction of points, wherein a point of a radius of 20 mm was taken as the reference point, was low in both the region of L/3 in a radial direction and the overall recording/reproducing area and the displacement quantity was about 10~80 μm. Further, the center of curvature in a radial direction of each of the recording media was at a surface side opposite to the hub-attached surface, and the radius of curvature indicated 10 m or more. Further, the radius of curvature in a circumferential direction indicated a value of 10 m or more. The number of times of hit in this case indicated excellent flying characteristics as 0~1 in both surfaces. Further, the scattering of SNR was excellent as 1 dB or less.

In Comparative Examples 1 and 2, in which the substrates were injection-molded so that the direction of deflection of each of the optical recording media was opposite to the recording media of Examples, the height in a radial direction of points wherein a point of a radius of 20 mm was taken as the reference point, was high in both the region of L/3 in a radial direction and the overall recording/reproducing area, and the displacement quantity was about 10~70 μm. Further, the center of curvature in a radial direction of each of the media was at a side of the hub-attached surface, and the radius of curvature indicated a value of less than 10 m. Further, the radius of curvature in a circumferential direction indicated a value of less than 10 m. In the flying characteristics in this case, ring-shaped hits took place at positions in the vicinity of an inner periphery of the optical recording media, and unstable flying characteristics were indicated. Further, the scattering of SNR was large as 3~4 dB which shows that there is a large influence by a fluctuation in the flying height of the head.

Example 3

A circular substrate made of polycarbonate having a diameter of 130 mm and a thickness of 2 mm in which spiral land/groove portions having a track pitch of 0.43 μm and a header portion were formed in both front and rear surfaces, was prepared by an injection-molding method. The metallic dies used for shaping were of a structure that the metallic dies comprised a pair of a moving portion and a stationary portion wherein a plastified resin was injected from a side of the stationary portion, and floating punch and protrusion pin were moved from a side of the moving portion to remove the substrate. The substrate was prepared by operating the floating punch and the protrusion pin after 5 seconds of opening the moving metallic die after the completion of the injection. The temperature of each of the stationary portion and the moving portion of the metallic dies was 110° C.

By using the substrate, layers were formed on both surfaces of the substrate by a sputtering method as described below.

First, an Al—3 wt % Cr alloy layer having a layer thickness of 50 nm was formed as a reflective layer on the substrate by a DC sputtering method. On this, a first protective layer of SiN having a layer thickness of 5 nm was formed by a reactive RF sputtering method using a Si target in an atmosphere of a mixture of Ar and $N_2$. On this, a magneto-optical recording layer of $Tb_{20}(Fe_{90}Co_{10})_{80}$ having a layer thickness of 20 nm was formed by a sputtering method using simultaneously a Tb target and a $Fe_{90}Co_{10}$ target.

On this, further, a second protective layer of SiN having a layer thickness of 50 nm was formed by a reactive RF sputtering method using a Si target in an atmosphere of a mixture of Ar and $N_2$. On this, a DLC layer having a refractive index of 1.85 at 633 nm and a layer thickness of 10 nm was formed by a reactive RF sputtering method using a C target in an atmosphere of a mixture of a Ar and $CH_4$.

Then, a reflective layer, a first protective layer, a magneto-optical recording layer, a second protective layer and a DLC layer were formed on the opposite surface in the same manner as for the above-mentioned surface.

After the formation of the DLC layer, the recording medium was lifted up from a 0.01 wt % solution of piperonyl-modified perfluoropolyether ("Fomblin: AN2001" (trade name) manufactured by Ausimont Company) using a perfluoropolyether type solvent ("GALDEN Sv-70" (trade name) manufactured by Ausimont Company) to coat a lubricant layer in a thickness of 1.5 nm. The layer thickness of the lubricant layer was calculated by using an X-ray photo-electron spectral method (XPS) and observing the Cls peak intensity.

Further, a metal insert hub was attached to a substrate surface which faced the floating punch and the protrusion pin at the time of injection-molding, by a UV curing type adhesive to thereby prepare a magneto-optical recording medium capable of recording/reproducing in both surfaces.

A non-recording/reproducing area in a central portion of the thus prepared optical recording medium was held so that the hub-attached surface directs upward, and the radius of curvature of the surface directing upward was measured with a Surfcoder (manufactured by Kosaka Institute) as a contact needle type surface roughness gauge. The measurement was conducted in a range of radius of 17~61 mm at 4 positions in a circumferential direction of the recording medium to obtain data of displacement values in height. On the basis of the data of displacement value in height, the radius of curvature in a surface area of 2 mm which corresponded to the width of the slider of the flying head was calculated successively in a range of radius of 18~60 mm. Further, on the basis of the data, examination was made whether the center of curvature of a circular arc consisting of 3 points of 18, 39 and 60 mm in radius was an upper side or a lower side with respect to the circular arc. Further, the radius of curvature in a circumferential direction of the recording medium was measured with a RVA tester (manufactured by THOT TECHNOLOGY COMPANY). The measurement was conducted to the recording medium at a pitch of 1 mm in a range of radius of 17~60 mm for each one circuit for each radial position to obtain data of displacement value in height. Based on these data, the radius of curvature in a surface area of about 3 mm which corresponded to the length of the slider of the flying head was calculated successively for each radial position over the one circuit. A result is shown in Table 2.

Example 4

A magneto-optical recording medium capable of recording/reproducing in both surfaces was prepared by the same method as in Example 3 except that in obtaining the substrate by injection-molding, the time from the completion of the injection of a polycarbonate resin into the metallic dies to the operation of the protrusion pin in the metallic dies, was shortened by 2 seconds. Then, the radius of curvature of the recording medium was measured. A result is shown in Table 2.

Example 5

A magneto-optical recording medium capable of recording/reproducing in both surfaces was prepared by the same method as in Example 3 except that in obtaining the substrate by injection-molding, a temperature difference was provided between the moving side metallic die and the stationary side metallic die wherein the temperature of the moving side metallic die was 3° C. higher than the stationary side metallic die. Then, the radius of curvature was measured. A result is shown in Table 2.

Comparative Example 3

A magneto-optical recording medium capable of recording/reproducing in both surfaces was prepared by the same method as in Example 3 except that in obtaining the substrate by injection-molding, the time from the completion of the injection of a polycarbonate resin into the metallic dies to the operation of the protrusion pin in the metallic dies, was shortened by 5 seconds, the substrate was removed immediately after the opening of the dies, and a metal insert hub was attached to the surface opposite to the surface which faced the floating punch and the protrusion pin at the time of injection-molding, by a UV curing type adhesive. Then, the radius of curvature was measured. A result is shown in Table 2.

Comparative Example 4

A magneto-optical recording medium capable of recording/reproducing in both surfaces was prepared by the same method as in Example 3 except that in obtaining the substrate by injection-molding, the time from the completion of the injecting of a polycarbonate resin into the metallic dies to the operation of the protrusion pin in the metallic dies was 30 seconds after the opening of the dies, temperatures of the moving side metallic die and the stationary side metallic die were lowered 12° C. equally, and a metal insert hub was attached to a surface opposite to the surface which faced the floating punch and the protrusion pin at the time of injection-molding, by UV curing type adhesive. Then, the radius of curvature was measured. A result is shown in Table 2.

The following evaluation was conducted to the near-field magneto-optical recording media prepared in Examples 3 to 5 and Comparative Examples 3 and 4. At the beginning, the flying characteristics of these recording media were evaluated. First, each of the recording media was set on the spindle of a glide tester (manufactured by Hitachi Electronic Engineering Company). The recording medium was rotated at a linear velocity of 7 m/sec to seek once both the front and rear surfaces simultaneously in a range of radius of 18~60 mm of the recording medium so that the flying height of the glide head (manufactured by Glide Light Company) with 70% slider and a load of 6.0 g having a piezo element from the recording medium was 50 nm constantly. At this moment, voltages induced in the piezo element were monitored, and the number of signals having a voltage value exceeding 500 mV was counted as the number of times of hit. Then, the measurement of SNR was conducted. The recording medium was rotated at 2,400 per minute, and a flying type optical head with a slider having a laser wavelength of 680 nm and an effective numerical aperture of 1.2 was floated at a height of 100 nm above the thin layer surface of the recording medium by a dynamic load. Recording was conducted by irradiating pulsed laser to heat the recording layer to the Curie temperature or more while a magnetic field by the coil on the head was modulated with 10 MHz. SNR recorded with 10 MHz was measured at 10 radial positions of 20, 30, 40, 50 and 60 mm in both front and rear surfaces. The values of scattering were obtained by a difference between the maximum value and the minimum value in each surface of the front and rear surfaces. The values of SNR were obtained by measuring under conditions that SNR becomes the maximum by adjusting power for reproducing for each medium. A result of the evaluation is summarized in Table 2.

TABLE 2

|  | Radius of curvature in radial direction Rr (m) | | Radius of curvature in circumferential direction Rt (m) | | | Number of hits (number) | | Scattering of SNR (dB) | |
| --- | --- | --- | --- | --- | --- | --- | --- | --- | --- |
|  | Maximum value | Minimum value | Maximum value | Minimum value | Center of curvature | Hub side | Opposite of hub side | Hub side | Opposite of hub side |
| Ex. 3 | 8.9 | 1.6 | 9.4 | 2.3 | Lower side | 0 | 0 | 0.7 | 0.5 |
| Ex. 4 | 7.7 | 2.5 | 5.7 | 0.8 | Lower side | 0 | 2 | 0.8 | 0.8 |

TABLE 2-continued

| | Radius of curvature in radial direction Rr (m) | | Radius of curvature in circumferential direction Rt (m) | | | Number of hits (number) | | Scattering of SNR (dB) | |
|---|---|---|---|---|---|---|---|---|---|
| | Maximum value | Minimum value | Maximum value | Minimum value | Center of curvature | Hub side | Opposite of hub side | Hub side | Opposite of hub side |
| Ex. 5 | 8.2 | 0.6 | 7.6 | 1.1 | Lower side | 1 | 1 | 0.7 | 0.6 |
| Comp. Ex. 3 | 8.1 | 0.2 | 7.3 | 0.5 | Upper side | 139 | 154 | 3.9 | 4.3 |
| Comp. Ex. 4 | 25.3 | 11.6 | 22.8 | 13.4 | Upper side | 133 | 138 | 3.2 | 3.7 |

In Example 3, the radius of curvature in either a radial direction or a circumferential direction satisfies a range of 1~10 m, and the center of curvature exists at a lower side of the circular arc. The number of hits in this case indicates excellent flying characteristics as 0 in both surfaces. Further, the scattering of SNR value was excellent as 1 dB or less.

In Example 4, the radius of curvature in a circumferential direction was small because the time until the operation of the protrusion pin in forming the substrate was shortened. However, the radius of curvature in a radial direction satisfies the range of 1~10 m, and the center of curvature exists at a lower side of the circular arc.

In Example 5, the radius of curvature in a radial direction was small because a temperature difference was provided to the metallic dies at the time of shaping the substrate. However, the radius of curvature in a circumferential direction satisfied the range of 1~10 m, and the center of curvature existed at a lower side of the circular arc. In both Examples 4 and 5, the number of hits was excellent as 0 to 2, and the scattering of SNR was excellent as 1 dB or less.

On the other hand, in Comparative Example 3, the radius of curvature in either a radial direction or a circumferential direction was 1 m or less in part, and the center of curvature existed at an upper side of the circular arc because the time until the operation of the protrusion pin at the time of shaping the substrate was further shortened and the substrate was removed from the metallic dies before they were sufficiently cooled. In the flying characteristics in this case, ring-shaped hits took place at positions in the vicinity of an inner circumference of the recording medium, and unstable flying characteristics were indicated. Further, SNR was smaller at a side of the inner periphery and larger at a side of the outer periphery, and their scattering was large as about 4 dB.

Example 6

A double surface substrate made of polycarbonate having a diameter of 130 mm and a substrate thickness of 2 mm was prepared by attaching two sets of stampers having a guide groove called as a groove having a track pitch of 0.45 μm and sector marks to mirror plates of stationary side and moving side shaping metallic dies and conducting injection-molding.

The flexural quantity of the substrate was measured by setting the substrate perpendicularly and by using an obliquely incident laser interference type flatness measuring device FM 200/Disk manufactured by TROPEL COMPANY. As a result, a surface having a convex form at a stationary side had a curve of 67 μm and a surface at a moving side had a curve of 65 μm.

By using the substrate, layers were formed on both surfaces of the substrate by a sputtering method in a manner as described below.

First, on the substrate, a Al—3 wt % Cr alloy layer (layer thickness: 50 nm) was formed as a reflective layer by a DC sputtering method. On this, a first protective layer of SiN (layer thickness: 5 nm) was formed by a reactive RF sputtering method using a Si target in an atmosphere of a mixture of Ar and $N_2$. On this, a magneto-optical recording layer (layer thickness: 20 nm) of $Tb_{20}(Fe_{90}Co_{10})_{80}$ was formed by a DC simultaneous sputtering method using a Tb target and a $Fe_{90}Co_{10}$ target. On this, further, a second protective layer of SiN (layer thickness: 30 nm) was formed by a reactive RF sputtering method using a Si target in an atmosphere of a mixture of Ar and $N_2$. On this, a DLC layer having a refractive index of 1.85 at 633 nm (layer thickness: 20 nm) was formed by a reactive RF sputtering method using a C target in an atmosphere of a mixture of Ar and $CH_4$.

Then, a reflective layer, a first protective layer, a magneto-optical recording layer, a second protective layer and a DLC layer were formed on the opposite surface in the same manner as the above-mentioned surface.

After the formation of the DLC layer, the recording medium was lifted up from a 0.01 wt % solution of piperonyl-modified perfluoropolyether ("Fomblin: AM2001" (trade name) manufactured by Ausimont Company) using a perfluoropolyether type solvent ("GALDEN SV-70" (trade name) manufactured by Ausimont Company) to coat a lubricant layer in a thickness of 1.5 nm. Thus, a near-field magneto-optical recording disk was completed.

The layer thickness of the lubricant layer was calculated by using an X-ray photo-electron spectral method (XPS) and observing the $C_1s$ peak intensity.

The flexural quantity of the completed near-field optical recording disk was measured in the same manner as the substrate. As a result, the flexural quantity of a surface having a convex form at a stationary side was 59 μm and the flexural quantity of a surface at a moving side was 58 μm.

Example 7

A substrate having a flexure of 31 μm in a surface having a convex form at a stationary side and a flexure of 34 μm in a surface at a moving side, was formed by providing a temperature difference between a mirror plate of a stationary side metallic die and a mirror plate of a moving side metallic die in injection-molding wherein the temperature of the mirror plate of a stationary side metallic die was 2° C. higher than the temperature of the moving side metallic die. Layers were formed and lubricant was coated in the same manner as in Example 6 to prepare a near-field magneto-optical recording disk.

The flexural quantity of the completed near-field optical recording disk was 28 μm in the surface having a convex form at a stationary side and 29 μm in the surface at a moving side.

Example 8

A substrate having a diameter of 90 mm and a thickness of 1.2 mm wherein a surface at a stationary side had a convex form having a flexural quantity of 14 μm and a surface at a moving side had a flexural quantity of 12 μm was prepared. Layers were formed and a lubricant agent was coated in the same manner as in Example 6 to prepare a near-field magneto-optical recording disk.

In flexural quantities of the completed near-field optical recording disk, the flexural quantity of the surface at a stationary side having a convex form was 12 μm and the flexural quantity of the surface at a moving side was 10 μm.

Comparative Example 5

A substrate having a diameter of 130 mm and a thickness of 2 mm wherein the flexural quantity of a surface at a stationary side having a convex form was 110 μm and a flexural quantity of a surface at a moving side was 108 μm, was prepared by providing a temperature difference between a mirror plate of a stationary side metallic die and a mirror plate of a moving side metallic die in injection-molding wherein the temperature of the mirror plate at the stationary side was 4° C. higher than the mirror plate at a moving side. Layers were formed and a lubricant agent was coated in the same manner as in Example 6 to prepare a near-field magneto-optical recording disk.

In flexural quantities of the completed near-field optical recording disk, the flexural quantity of the surface at a stationary side having a convex form was 108 μm and the flexural quantity of the surface at a moving side was 105 μm.

Comparative Example 6

A substrate having a diameter of 130 mm and a thickness of 2 mm wherein the flexural quantity of a surface at a stationary side having a convex form was 4 μm and the flexural quantity of a surface at a moving side was 3 μm, was prepared by providing a temperature difference between a mirror plate of a stationary side metallic die and a mirror plate of a moving side metallic die in injection-molding wherein the temperature of the mirror plate at a moving side was 1° C. higher than the temperature of the mirror plate at a stationary side. Layers were formed and a lubricant agent was coated in the same manner as in Example 6 to prepare a near-field magneto-optical recording disk.

In flexural quantities of the completed near-field optical recording disk, the flexural quantity of the surface at a stationary side having a convex form was 4 μm and the flexural quantity of the surface at a moving side was 3 μm.

Comparative Example 7

A substrate having a diameter of 90 mm and a thickness of 1.2 mm wherein the flexural quantity of a surface at a stationary side having a convex form was 108 μm and the flexural quantity of a surface at a moving side was 110 μm, was prepared by providing a temperature difference between a mirror plate of a stationary side metallic die and a mirror plate of a moving side metallic die in injection-molding wherein the temperature of the mirror plate at a stationary side was 4° C. higher than the temperature of the mirror plate at a moving side. Layers were formed and a lubricant agent was coated in the same manner as in Example 6 to prepare a near-field magneto-optical recording disk.

In flexural quantity of the completed near-field optical recording disk, the flexural quantity of the surface at a stationary side having a convex form was 106 μm and the flexural quantity of the surface at a moving side was 105 μm.

A hub was attached to the surface at a stationary side of each of the thus obtained near-field magneto-optical recording disks, and each of the disks was set on a glide tester with the hub-attached surface directing downward. Seeking was conducted to both surfaces simultaneously by a glide head (manufactured by Glide Light Company: 70% slider, 0.012"×6.0 gr) with a piezo element while each disk was rotated at a linear velocity of 7.5 m/s in a range of radius of 30~61.0 mm in a the substrate having a diameter of 130 mm, and in a range of radius of 25~40.0 mm in a case of the substrate having a diameter of 90 mm. The flying quantity of the glide head was 0.05 μm at a linear velocity of 7.5 m/s. Voltages induced in seeking in the piezo element of the glide head were observed by an oscilloscope. In this case, a voltage value exceeding 800 mV was counted under the judgment that the glide head contacted the recording medium.

The above-mentioned measurement was conducted to the near-field magneto-optical recording disks in Examples 6~8 and Comparative Examples 5~7. In the disks of Examples 6~8, there was no visible flaw in both surfaces in the measured area, and the number of times of hit as the number of times of contact to the recording media was excellent as 0 in all media. On the other hand, in the disks of Comparative Examples 5~7, crushing by the head took place.

Example 9

Circular substrates made of polycarbonate having a diameter of 130 mm in which a guide groove having a track pitch of 0.43 μm was formed, were prepared by injection-molding. In the substrates, a circular groove of one round and a circular groove of one round were formed respectively at positions of diameter of 36 mm and 126 mm with a force-cutting blade. The width of groove was 6 μm and the depth was 1 μm in either grooves. On this, an AlCr alloy having a layer thickness of 50 nm was laminated as a reflective layer by a DC sputtering method. Further, as a recording layer, TbFeCo having a layer thickness of 20 nm was laminated by a DC sputtering method. On this, SiN having a layer thickness of 50 nm was laminated as a dielectric layer by a reactive DC sputtering method using a Si target in an atmosphere of a mixture of Ar and $N_2$. On this, further, diamond-like carbon (DLC) having a layer thickness of 20 nm was laminated as a solid lubricant layer by a reactive RF sputtering method using a C target in an atmosphere of a mixture of Ar and $CH_4$ to prepare near-field magneto-optical recording media. Each of the layers was formed in a range of 34 mm to 130 mm in diameter on the circular substrates.

With respect to the thus prepared 10 recording media, an error rate in an ID area having a format information and a data error rate were measured in a recording/reproducing area in a range of radius of 20~62 nm by a drive for near-field magneto-optical recording. The number of revolution of the recording media was 2,400 per minute and the flying height of the SIL head was 0.1 μm.

Then, a long time seek test was conducted with the SIL head. Each of the recording media was set on the spindle of a drive, and was rotated at 2,400 per minute. The SIL head was loaded on the recording medium in a flying height of 0.1 μm at 7 Hz to seek continuously a range of radius of 20~62 mm for 24 hours.

After the completion of the seek, the SIL head was unloaded, and cleaning was conducted by the flying head. Each of the recording media was rotated at 4,000 per minute, and a delta head (manufactured by Glide Light Company)

made of AlTiC was loaded with a head load of 3.5 g on a position of radius of 40 mm on the recording medium. While the recording medium was rotated at a linear velocity of 8 m/sec so that the flying height of the delta head was constant at 0.03 µm, the recording medium was seeked from a radius of 40 mm to 17 mm by the delta head; then, seeked from a radius of 17 mm to 64 mm, and further, after the number of revolution of the recording medium was rendered to be 4,000 per minute, the delta head was unloaded at a radius of 64 mm.

Further, on each of the recording medium subjected to cleaning after the seek test, an error rate in the ID area and a data error rate in the recording/reproducing area were measured in a range of radius of 20~62 mm by using the same drive as used for measuring the error rates before the seek test under the same measuring conditions.

On the 10 recording media, 10 cycles of measurement, wherein one cycle includes a seek test, a cleaning operation with the flying head and measurement of error rates which are conducted by the same procedures as in the first time as described above, were repeated to confirm a change of the error rates.

Figure 4:
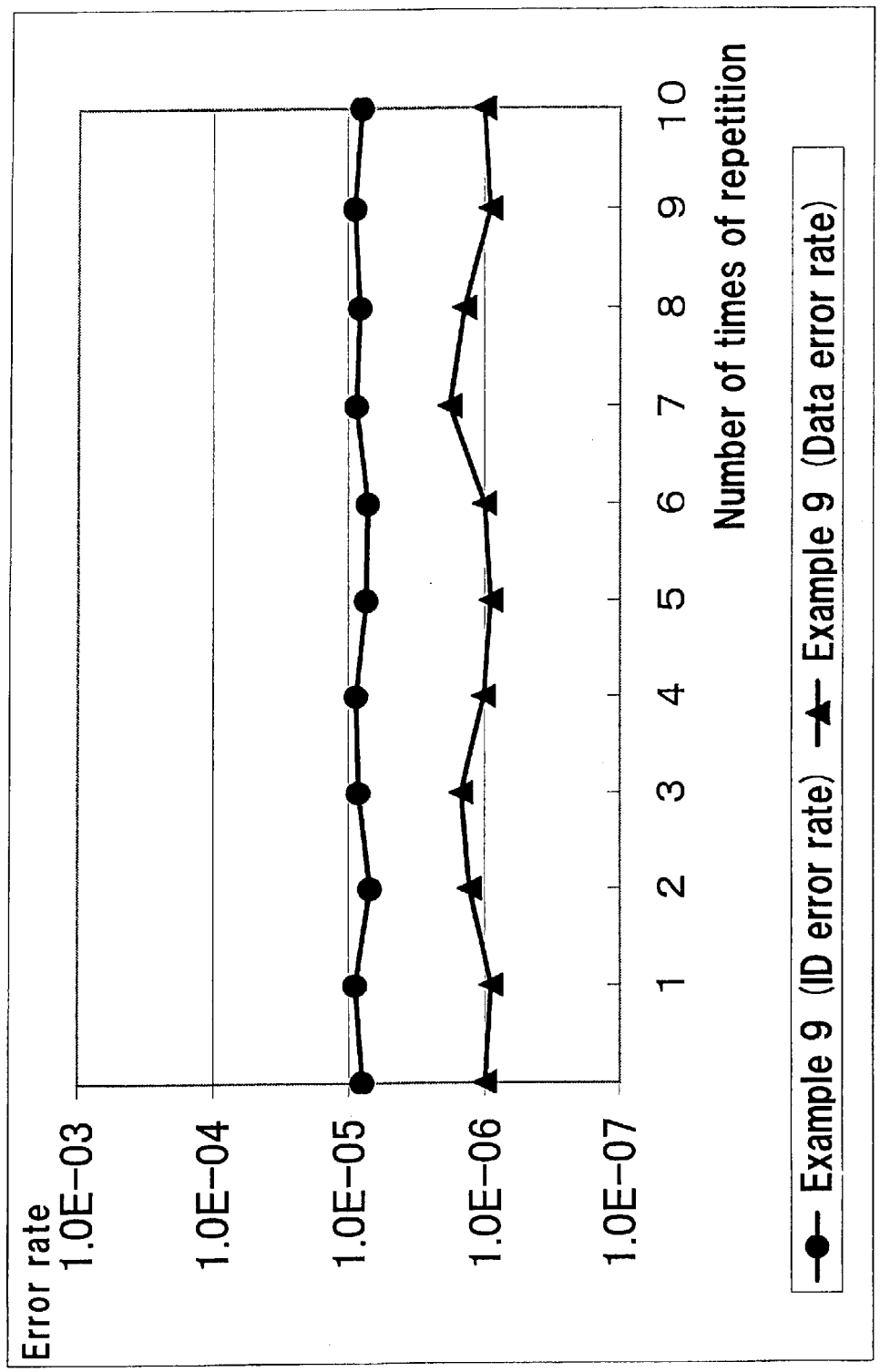
FIG. 4 is a graph showing an example of the effect provided by the near-field magneto-optical recording medium of the present invention which shows error rates of the magneto-optical recording medium vs. the number of times of repetition of a long time seek test in which ● indicates ID error rate in Example 9 and ▲ indicates data error rate as a result of measurement.

FIG. 4 shows a result of the measurement of error rates conducted in Example 9. Numerical values of each error rate are indicated by an average value in a result of measuring 5 recording media.

In the recording media prepared by the method according to Example 9, the ID error rate and the data error rate after the repetition of 10 times of seek test do not show substantial change.

In the recording media prepared by the method according to Example 9, it is confirmed in observation with an optical microscope that fine foreign matters are accumulated in the grooves formed at radial positions of 18 mm and 63 mm in the substrate of the recording media and that a cleaning effect can be obtained by the flying head in each seek test.

As described above, according to the present invention, the distance between the flying optical head floating above an optical recording medium and the surface of the optical recording medium can be kept constant in the entire recording/reproducing area; uniform recording/reproducing signals can be obtained, and a highly reliable optical recording medium can be obtained while crushing by the head can be suppressed.

Further, an optical recording medium of high durability and reliability can be obtained wherein a problem of the deposition of foreign matters in a recording/reproducing area due to a repeated use can be eliminated and high cleanness can be maintained.

What is claimed is:

1. An optical recording medium comprising:
    a circular body including (1) a substrate and (2) a recording layer and a dielectric layer formed on the substrate, the circular body having a recording/reproducing area; and
    a hub attached to a hub-attached surface of the circular body,
    wherein, in a state in which the circular body is supported by the hub so that the hub-attached surface directs downward, a region extending from an innermost periphery of the recording/reproducing area to L/3, where L is a distance in a radial direction from the innermost periphery to an outermost periphery of the recording/reproducing area, has a center of curvature in a radial direction only at an opposite side with respect to the hub-attached surface.

2. The optical recording medium according to claim 1, wherein, in a state in which the circular body is supported by the hub so that the hub-attached surface directs downward, the region is 5 µm~100 µm lower than the innermost periphery of the recording/reproducing area.

3. The optical recording medium according to claim 1, wherein, in a state in which the circular body is supported by the hub so that the hub-attached surface directs downward, the region has a radius of curvature in a radial direction in a surface area of the circular body having substantially the same width as a slider of at least 10 m.

4. The optical recording medium according to claim 1, wherein, in a state in which the circular body is supported by the hub so that the hub-attached surface directs downward, an outer region, which extends radially outward from L/3 to the outermost periphery, has a center of curvature in a radial direction at an opposite side with respect to the hub-attached surface.

5. The optical recording medium according to claim 1, wherein, in a state in which the circular body is supported by the hub so that the hub-attached surface directs downward, an outer region, which extends radially outward from L/3 to the outermost periphery is 5 µm~100 µm lower than the innermost periphery of the recording/reproducing area.

6. The optical recording medium according to claim 1, wherein, in a state in which the circular body is supported by the hub so that the hub-attached surface directs downward, an outer region, which extends radially outward from L/3 to the outermost periphery, has a radius of curvature in a radial direction of a surface area of the circular body having the same width as a slider of at least 10 m.

7. The optical recording medium according to claim 1, wherein, in a state in which the circular body is supported by the hub so that the hub-attached surface directs downward, a radius of curvature in a circumferential direction of a surface area of the circular body having the same length as a slider is at least 10 m.

8. The optical recording medium according to claim 1, wherein a circumferentially arranged groove is formed in at least one of an inner side region and an outer side region with respect to the recording/reproducing area.

9. The optical recording medium according to claim 1, wherein a groove arranged in a polygonal form is formed in at least one of an inner side region and an outer side region with respect to the recording/reproducing area.

* * * * *